(12) United States Patent
Jones et al.

(10) Patent No.: US 12,012,347 B2
(45) Date of Patent: *Jun. 18, 2024

(54) COOLING POND WATER TREATMENT SYSTEM

(71) Applicant: Evoqua Water Technologies LLC, Pittsburgh, PA (US)

(72) Inventors: Carol Jones, Plant City, FL (US); Justin Wayne Higgs, Nolensville, TN (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/103,470

(22) Filed: Jan. 30, 2023

(65) Prior Publication Data

US 2023/0174405 A1    Jun. 8, 2023

Related U.S. Application Data

(63) Continuation of application No. 17/232,137, filed on Apr. 15, 2021, now Pat. No. 11,565,959.

(60) Provisional application No. 63/010,649, filed on Apr. 15, 2020.

(51) Int. Cl.
| | | |
|---|---|---|
| C02F 9/00 | (2023.01) | |
| C02F 1/44 | (2023.01) | |
| C02F 1/469 | (2023.01) | |
| C02F 1/50 | (2023.01) | |
| C02F 1/66 | (2023.01) | |
| C02F 1/70 | (2023.01) | |
| C02F 5/08 | (2023.01) | |
| C02F 103/02 | (2006.01) | |

(52) U.S. Cl.
CPC ............... C02F 9/00 (2013.01); *C02F 1/441* (2013.01); *C02F 1/444* (2013.01); *C02F 1/4693* (2013.01); *C02F 1/50* (2013.01); *C02F 1/66* (2013.01); *C02F 1/70* (2013.01); *C02F 5/08* (2013.01); *C02F 2103/023* (2013.01); *C02F 2209/055* (2013.01)

(58) Field of Classification Search
None
See application file for complete search history.

(56) References Cited

U.S. PATENT DOCUMENTS

| | | |
|---|---|---|
| 5,114,576 A | 5/1992 | Ditzler et al. |
| 8,647,509 B2 | 2/2014 | Vora et al. |
| 2003/0127391 A1 | 7/2003 | Craft et al. |
| 2003/0183575 A1 | 10/2003 | Zeiher et al. |

(Continued)

*Primary Examiner* — Peter Keyworth

(57) ABSTRACT

A method of increasing operational efficiency of a power plant includes determining an average rate of accumulation of scale-forming compounds in a cooling water source, directing water from the cooling water source having a first concentration of scale forming compounds through a treatment system to produce a treated water having a lower concentration of scale-forming components than the first concentration by operating the treatment system with operating parameters selected such that a rate of removal of the scale-forming components from the water in the treatment system is greater than the average rate of accumulation of the scale-forming components, directing the treated water back into the cooling water source, and circulating water including the treated water from the cooling water source through a cooling system of the power plant.

18 Claims, 4 Drawing Sheets

(56) References Cited

U.S. PATENT DOCUMENTS

2005/0242036 A1 11/2005 Harris
2007/0181496 A1 8/2007 Zuback
2013/0233796 A1 9/2013 Rao et al.

| Parameter | Unit | Value |
|---|---|---|
| Calcium | mg/l as CaCO3 | 252 |
| Magnesium | mg/l as CaCO3 | 378 |
| Sodium | mg/l as CaCO3 | 421 |
| Potassium | mg/l as CaCO3 | 33 |
| Aluminum | mg/l | 0.7 |
| Strontium | mg/l | 2.1 |
| Bicarbonate | mg/l as CaCO3 | 234 |
| Chloride | mg/l as CaCO3 | 345 |
| Bromide | mg/l as CaCO3 | 6.8 |
| Nitrate | mg/l as CaCO3 | 3.6 |
| Phosphate | mg/l as CaCO3 | 15.7 |
| Sulfate | mg/l as CaCO3 | 493 |
| Silica | mg/l as CaCO3 | 1.7 |
| Turbidity | NTU | 0.2 |
| Conductivity | µS/cm | 1895 |
| Total Hardness | mg/l as CaCO3 | 630 |
| TOC | mg/l | 28 |
| Mineral Acidity | mg/l as CaCO3 | 0 |
| Ammonia | mg/l as CaCO3 | 3.0 |
| Phosphorous | mg/l | 1.0 |
| TDS | mg/l | 1023 |
| Total Acidity | mg/l as CaCO3 | 2.8 |
| Field Cond. | µS/cm | 1947 |
| Field pH | S.U. | 8.4 |
| Field Temp. | °C | 36.7 |

*FIG. 1*

COOLING POND WATER TREATMENT SYSTEM

CROSS-REFERENCE TO RELATED APPLICATIONS

This application claims priority under 35 U.S.C. § 119(e) to U.S. Provisional Patent Application Ser. No. 63/010,649 titled "COOLING POND WATER TREATMENT SYSTEM", filed Apr. 15, 2020, the entire contents of which are incorporated herein by reference.

BACKGROUND

Aspects and embodiments disclosed herein relate to systems and methods for increasing operational efficiency and reducing downtime of an industrial facility by treating cooling water for the facility to reduce the tendency of the cooling water to form scale within the cooling system of the facility.

SUMMARY

In accordance with one aspect, there is provided a method of increasing operational efficiency of a power plant. The method comprises determining an average rate of accumulation of scale-forming compounds in a cooling water source, directing water from the cooling water source having a first concentration of scale forming compounds through a treatment system to produce a treated water having a lower concentration of scale-forming components than the first concentration by operating the treatment system with operating parameters selected such that a rate of removal of the scale-forming components from the water in the treatment system is greater than the average rate of accumulation of the scale-forming components, directing the treated water back into the cooling water source, and circulating water including the treated water from the cooling water source through a cooling system of the power plant.

In some embodiments, operating the treatment system comprises pretreating the water from the cooling water source in a pretreatment stage configured to biologically deactivate biological organisms in the water from the cooling water source and produce a pretreated water, treating the pretreated water in a membrane separation stage configured to separate the pretreated water into permeate and brine, and treating the brine in a brine recovery stage configured to separate the brine into the treated water and a reject.

In some embodiments, pretreating the water from the cooling water source includes adding a biocide to the water from the cooling water source.

In some embodiments, pretreating the water from the cooling water source further includes adding a pH adjustment agent to the water from the cooling water source.

In some embodiments, adding the pH adjustment agent to the water from the cooling water source includes adjusting the pH of the water from the cooling water source to a pH of between 6.5 and 7.5.

In some embodiments, pretreating the water from the cooling water source further includes holding the water from the cooling water source in a storage tank downstream of a point of injection of the biocide for a time sufficient to deactivate substantially all microorganisms that were present in the water from the cooling water source.

In some embodiments, treating the pretreated water in the membrane separation stage includes filtering the pretreated water with an ultrafiltration unit to produce a first filtered water.

In some embodiments, the method further comprises backwashing the ultrafiltration unit to produce a backwash waste and directing the backwash waste into the cooling water source.

In some embodiments, treating the pretreated water in the membrane separation stage further includes filtering the first filtered water in a first reverse osmosis unit to separate the first filtered water into the permeate and the brine.

In some embodiments, the method further comprises adding one or more of a reducing agent, an anti-scaling agent, or a pH adjustment agent to the first filtered water prior to filtering the first filtered water in the first reverse osmosis unit.

In some embodiments, treating the brine in the brine recovery stage includes filtering the brine in a second reverse osmosis unit to produce the treated water and the reject.

In some embodiments, treating the brine in the brine recovery stage includes filtering the brine in a reverse osmosis unit to produce the treated water and the reject.

In some embodiments, the method further comprises adding a biocide to the brine prior to filtering the brine in the reverse osmosis unit.

In some embodiments, the method further comprises holding the brine in a storage tank downstream of a point of injection of the biocide into the brine for a time sufficient to deactivate substantially all microorganisms that were present in the brine.

In some embodiments, the method further comprises adding one or more of a reducing agent, an anti-scaling agent, or a pH adjustment agent to the brine prior to filtering the brine in the reverse osmosis unit.

In some embodiments, treating the brine in the brine recovery stage includes separating the brine into the treated water and the reject in an electrically driven separation apparatus.

In some embodiments, treating the brine in a brine recovery stage includes separating the brine into the treated water and the reject in one of an electrodialysis system or an electrodialysis reversal system.

In some embodiments, the method further comprises adding a biocide to the brine prior to separating the brine into the treated water and the reject in the electrically driven separation apparatus.

In some embodiments, the method further comprises holding the brine in a storage tank downstream of a point of injection of the biocide into the brine for a time sufficient to deactivate substantially all microorganisms that were present in the brine.

In some embodiments, the method further comprises adding one or more of an anti-scaling agent or a pH adjustment agent to the brine prior to separating the brine into the treated water and the reject in the electrically driven separation apparatus.

In accordance with another aspect, there is provided a method of remediating water having a first concentration of scale-forming compounds from a water source. The method comprises pretreating the water from the water source in a pretreatment stage configured to biologically deactivate biological organisms in the water from the water source and produce a pretreated water, treating the pretreated water in a membrane separation stage configured to separate the pretreated water into permeate and brine, treating the brine in a brine recovery stage configured to separate the brine into a treated water having a lower concentration of scale-forming components than the first concentration and a reject, and directing the treated water into the water source. The acts of pretreating the water, treating the pretreated water, and treating the brine are performed at a rate such that a rate of removal of the scale-forming components from the water is greater than the average rate of accumulation of the scale-forming components in the water source.

In some embodiments, treating the pretreated water in the membrane separation stage includes filtering the pretreated water with an ultrafiltration unit to produce a first filtered water and filtering the first filtered water in a reverse osmosis unit to separate the first filtered water into the permeate and the brine.

In some embodiments, treating the brine in the brine recovery stage includes separating the brine into the treated water and the reject in a second reverse osmosis unit.

In some embodiments, treating the brine in the brine recovery stage includes separating the brine into the treated water and the reject in one of an electrodialysis system or an electrodialysis reversal system.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawing:

FIG. 1 is a table of parameters of one example of water from a source of water to be treated in embodiments of systems and methods disclosed herein;

DETAILED DESCRIPTION

Figure 2:
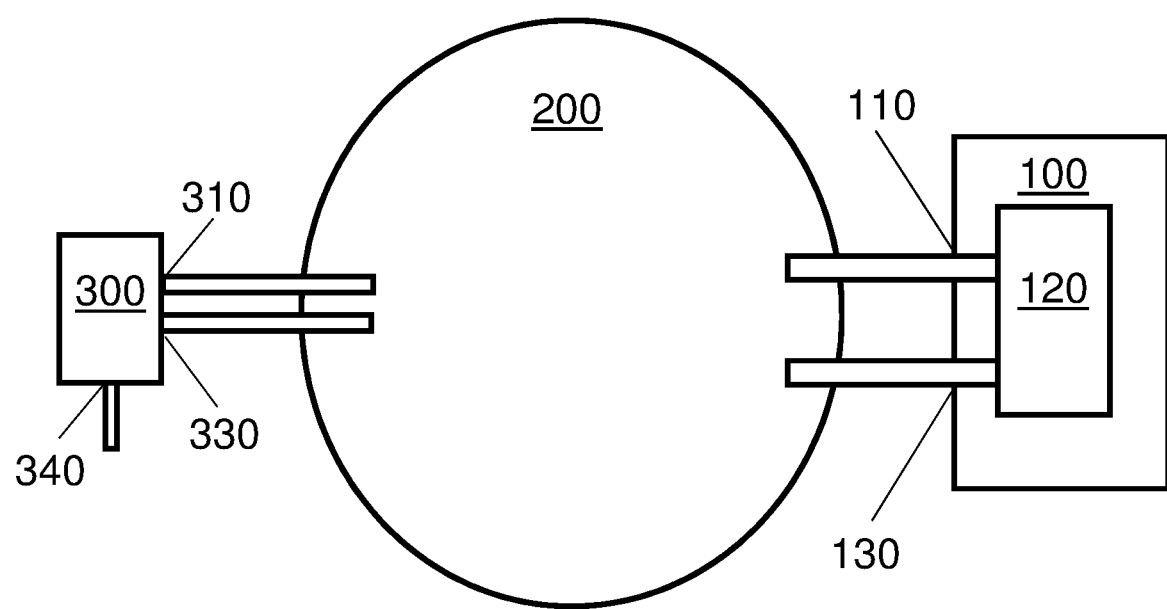
FIG. 2 is a diagram of an environment in which the systems and methods disclosed herein may be implemented.

Many industrial facilities utilize cooling water to cool various types of equipment with the facility. The cooling water may come from a variety of sources such as public utilities, groundwater, rivers, lakes, or even the ocean. A problem occurs when the cooling water includes significant concentrations of scale-forming compounds, for example, calcium (Ca), magnesium (Mg), or phosphate ($PO_4^{3-}$) that may precipitate out of the cooling water and form scale such as calcium carbonate ($CaCO_3$), calcium phosphate ($Ca_3(PO_4)_2$), magnesium carbonate ($MgCO_3$), or other forms of scale on the components of the cooling system of the facility. If too much scale is formed, the components of the cooling system may become blocked or require more energy to pump water through and may need to be taken offline for maintenance to remove the scale at a cost to the facility in terms of operational downtime as well as costs associated with the chemicals and labor for removing the accumulated scale.

In some facilities, for example, power plants that use the cooling water to cool steam used for power generation back into liquid water, scale deposits may accumulate within the condensers of the power plant. Scale buildup in the condenser tubes reduces heat transfer efficiency and increases back-pressure on the steam side of the condenser. Increased condenser back-pressure reduces steam turbine efficiency, which reduces the generating capacity of the steam turbines.

In one particular example, over the past 20 years, a power generation facility with four natural gas-fired two-on-one combined cycle power blocks, has utilized a 1,200 acre, 8 billion gallon cooling pond. The cooling pond water is constantly cycling through and returning from the multiple condensers of the power generation facility, when in operation. Periodic sampling of Compliance Ground Water Monitoring for the cooling pond has quantified gradual increases in conductivity and total dissolved solids (TDS) over the past ten years. While the site receives upwards of 52 inches of average annual rainfall, the constant heat-load on the pond has resulted in a net annual loss of water from the pond via evaporation. The pond level has been maintained through the addition of well water, treated municipal water, and storm-water runoff from the surrounding area. Various scale-forming compounds may leach into the pond water from the ground. The site has no National Pollutant Discharge Elimination System (NPDES) permit nor liquid waste stream leaving the pond to prevent the continual increase of dissolved solids concentrations. As the dissolved solids concentration has increased in the pond, the facility has experienced efficiency losses, scaling, and increased maintenance on condenser tubes and heat exchangers as calcium carbonate saturation has increased. A sample of the pond water was analyzed and found to have the concentrations of components and other parameters listed in the table of FIG. 1.

Aspects and embodiments disclosed herein are directed to systems and processes for treating water and wastewater to remove scale-forming compounds from water used as cooling water in an industrial facility. Removing the scale-forming components from the cooling water reduces the tendency of the cooling water to deposit scale in the cooling system of the facility and increases operational efficiency and reduces facility downtime. Aspects and embodiments of the disclosed systems and processes may utilize a first membrane separation stage, including at least one ultrafiltration (UF) unit and one or more first reverse osmosis (RO) units. Aspects and embodiments of the disclosed systems and processes may also utilize a secondary or recovery stage including a brine recovery system that may include a reverse osmosis system and/or an electrically driven separation system, for example, an electrodialysis (ED) or electrodialysis reversal (EDR) system. In a particular embodiment, the treatment system and process can be utilized to decrease the overall hardness of cooling pond water and reduce maintenance costs on condensers of a power generation facility or cooling system components of other types of industrial facilities that utilize the cooling pond water. The embodiments of the systems and process disclosed herein may operate with a total rejection of scale-forming compounds of 90% or greater and an overall water recovery of 90% or greater.

An overall schematic of the environment in which systems and methods disclosed herein may be implemented is illustrated in FIG. 2. An industrial facility 100 pumps cooling water from a pond 200 into a cooling water inlet 110, through the cooling system 120 in the facility 100, and then through an outlet 130 back into the pond 200. A water treatment or remediation system 300 as disclosed herein also pumps water from the pond 200 through a feed inlet 310, through the treatment equipment in the system 300, described below, and then through a treated water outlet 330 back into the pond 200. The water treatment or remediation system 300 may also include a waste outlet 340 for reject including scale-forming compounds removed from the treated water.

The water treatment or remediation system 300 may be unconnected to the cooling water inlet 110 or outlet 130 of the industrial facility 100 and may operate independently of the cooling system 120 of the facility. The water treatment or remediation system 300 may be operated such that the overall concentration of one or more scale-forming compounds in the pond 200 are removed at a greater rate than they accumulate in the pond 200 due to water influent to the pond including these compounds, leaching of scale-forming components from the ground into the pond, and evaporation of pure water from the pond 200. The rate of accumulation of the one or more scale-forming compounds in the pond 200 may be determined from historical or ongoing analysis of samples of water from the pond 200.

Figure 3:
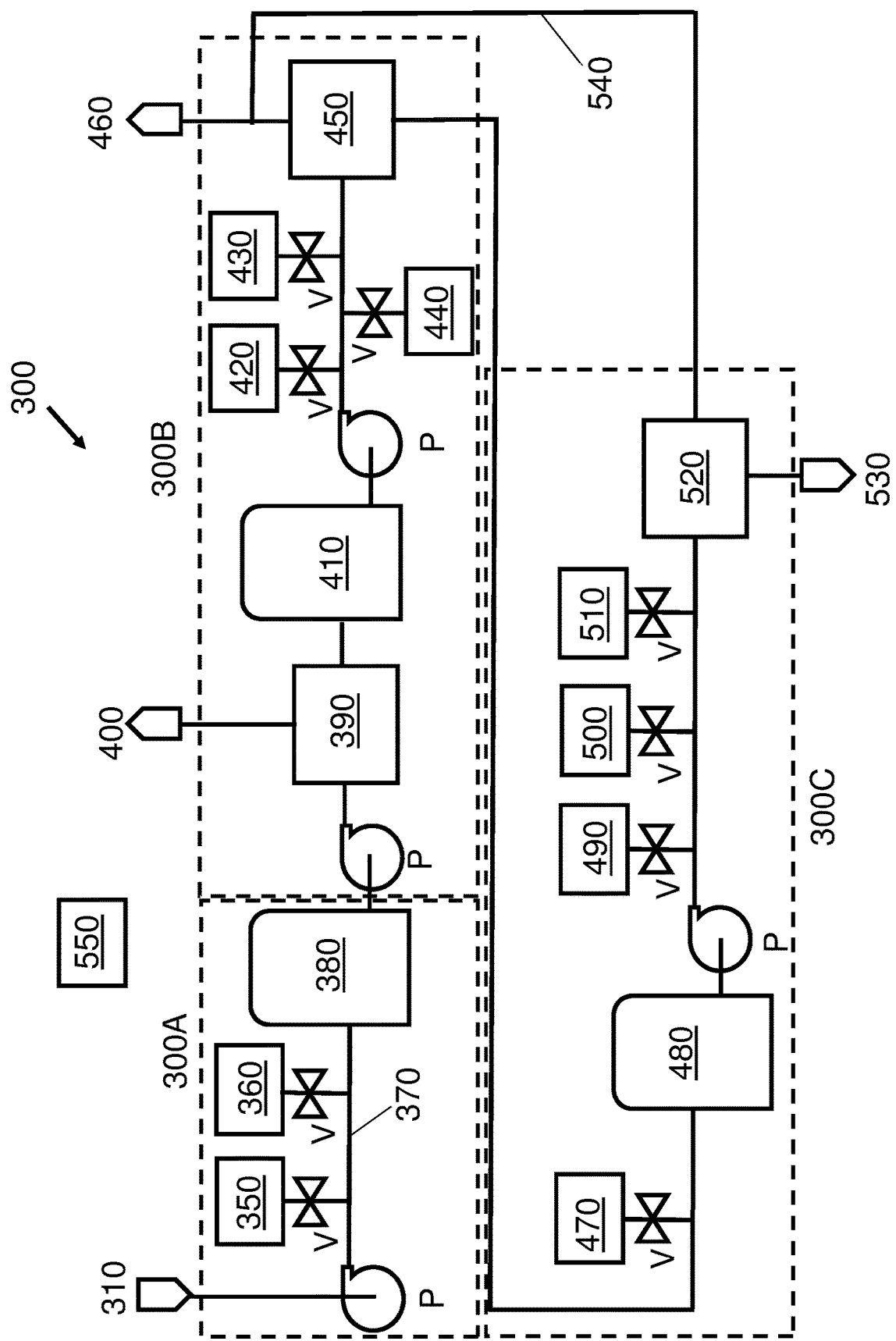
FIG. 3 illustrates one example of a system as disclosed herein.

One example of a water treatment system 300 as disclosed herein is illustrated in FIG. 3. The system includes, upstream of the first membrane separation stage 300B, a pretreatment stage 300A that at least partially biologically inactivates the water to be treated, for example, pond water for used for cooling condensers to produce a pre-treated water stream. The pretreatment stage includes units that provide introduction of at least one of a biocide, bacteriocide, fungicide, or other chemicals, for example, a sodium hypochlorite injection unit 350, that doses the pond water to be treated with sodium hypochlorite and destroys or inactivates microorganism and/or algae present in the influent pond water. The pretreatment stage may optionally include a pH adjustment agent introduction unit 360 that adjust the pH of the influent pond water to be treated to be in a desired pH range by injection of, for example, sulfuric acid or sodium hydroxide into the influent feed water stream. Control valves V may be provided to meter the chemicals from the injection units 350, 360 into a feed line 370 through which the influent pond water to be treated flows. In some embodiments, the pH of the pond water to be treated is adjusted to a pH of between about 6.5 and 7.5 or about 7.0. Optionally, the pretreated water can be stored in a storage tank 380 prior to introduction into the first membrane separation stage 300B. The pretreated water may have a residence time in the storage tank 380 sufficient for the biocide, bacteriocide, fungicide, or other chemicals to kill or inactive all or substantially all microorganisms and/or algae that was present in the influent pond water. Killing or inactivating substantially all of the microorganisms and/or algae may include bringing a concentration of living microorganisms and/or algae in the pretreated water to below detection limits of one or more forms of equipment that may be used to detect living microorganisms and/or algae in the pretreated water.

The first membrane separation stage 300B can comprise an ultrafiltration system (UF) 390. A commercially available example of the UF can be the UF148 system from Evoqua Water Technologies. The UF system may include one or more UF modules each including hundreds of Multibore® polyethersulfone capillary membrane fibers, each capillary membrane fiber having a plurality, for example, seven, 0.9 mm or 1.5 mm diameter capillaries. The UF module(s) may be operated in an inside-out mode wherein feed to be filtered, for example, the pretreated water, is introduced into bores of the filtration membrane capillaries and filtered outward through walls of the membrane capillaries to produce ultrafiltered water as filtrate. The recovery of the UF 390 may be 90% or above, depending on the quality of the pond water. A filtrate storage tank 410 may be provided downstream of the UF 390 to provide filtrate for backwashing the UF 390. Backwashing of the UF 390 may be performed on a time basis, responsive to inlet pressure of the UF 390 reaching or exceeding a setpoint, or both. Backwash waste 400 from backwashing the UF 390 may be discarded or returned to the pond 200.

The ultrafiltered water or filtrate water stream from the UF 390 may be treated in a reverse osmosis train (RO) 450. In some examples, the RO may include a VANTAGE® M84 reverse osmosis system from Evoqua Water Technologies. The RO 450 may be operated at a recovery of 75% or more. Optionally, neutralizing agents, for example, reducing agents such as sulfite or sodium bisulfate to reduce a concentration of free chlorine can be introduced into in the stream being directed to the RO unit 450 by injecting unit 420 to prevent damage to the membranes of the RO unit 450 by the chlorine. Additionally or alternatively, pH adjustment agents, and/or hardness and anti-scaling additives, for example, ChemTreat® RL9004 or RL1197 or Avista™ Vitec™ 7000 scale inhibitors from ChemTreat and Avista, respectively, can be introduced into the filtrate stream utilizing respective injection units 430, 440 prior to treatment in the RO 450. The pH set point may be set based on the concentration of the various scaling agents in the feed water and may be, for example, between 6.5 and 7.5 or about 7.0 in different embodiments. Permeate 460 from the RO 450 can be returned to the source of the water to be treated, for example, the pond 200.

Reject 465 from the RO 450 may be considered brine and can be further treated in the brine recovery stage 300C, which, in some embodiments, includes a brine recovery reverse osmosis system (BRRO) 520. The BRRO may be, for example, a VANTAGE® M83 reverse osmosis system from Evoqua Water Technologies. The BRRO 520 may be operated at a recovery of 50% or more. Optionally, additional biocides, anti-scaling and other chemical treating agents, such as pH-adjusting agents and reducing agents can be added to the reject 465 from the RO 450 prior to treatment in the BRRO from respective injection units 470 (sodium hypochlorite), 490 (anti-scaling agent), 500 (reducing agent, for example, sulfite or sodium bisulfate), and 510 (pH adjustment agent, for example sulfuric acid or sodium hydroxide to reduce potential for scale formation the BRRO 520), and associated control valves V. In some embodiments, a holding tank 480 may be provided downstream of the biocide injection unit 470 to allow the biocide time to attack and kill or inactive all or substantially all algae or other biological contaminants in the reject 465 from the RO 450. Permeate 540 from the BRRO 520 may be considered treated water and can be combined with permeate 460 from the RO, and/or returned to the pond 200. Reject water 530 from the BRRO can be discarded, optionally after concentration by evaporation or other forms of further treatment or sent to a publicly owned treatment works.

Controller 550, which may be a general-purpose computer or specialized control system may be programmed with instructions to operate the various valves V, pumps P, and other unit operations of the system 300 to perform the methods disclosed herein. Connections between the controller 550 and other system components are not illustrated for sake of clarity.

Figure 4:
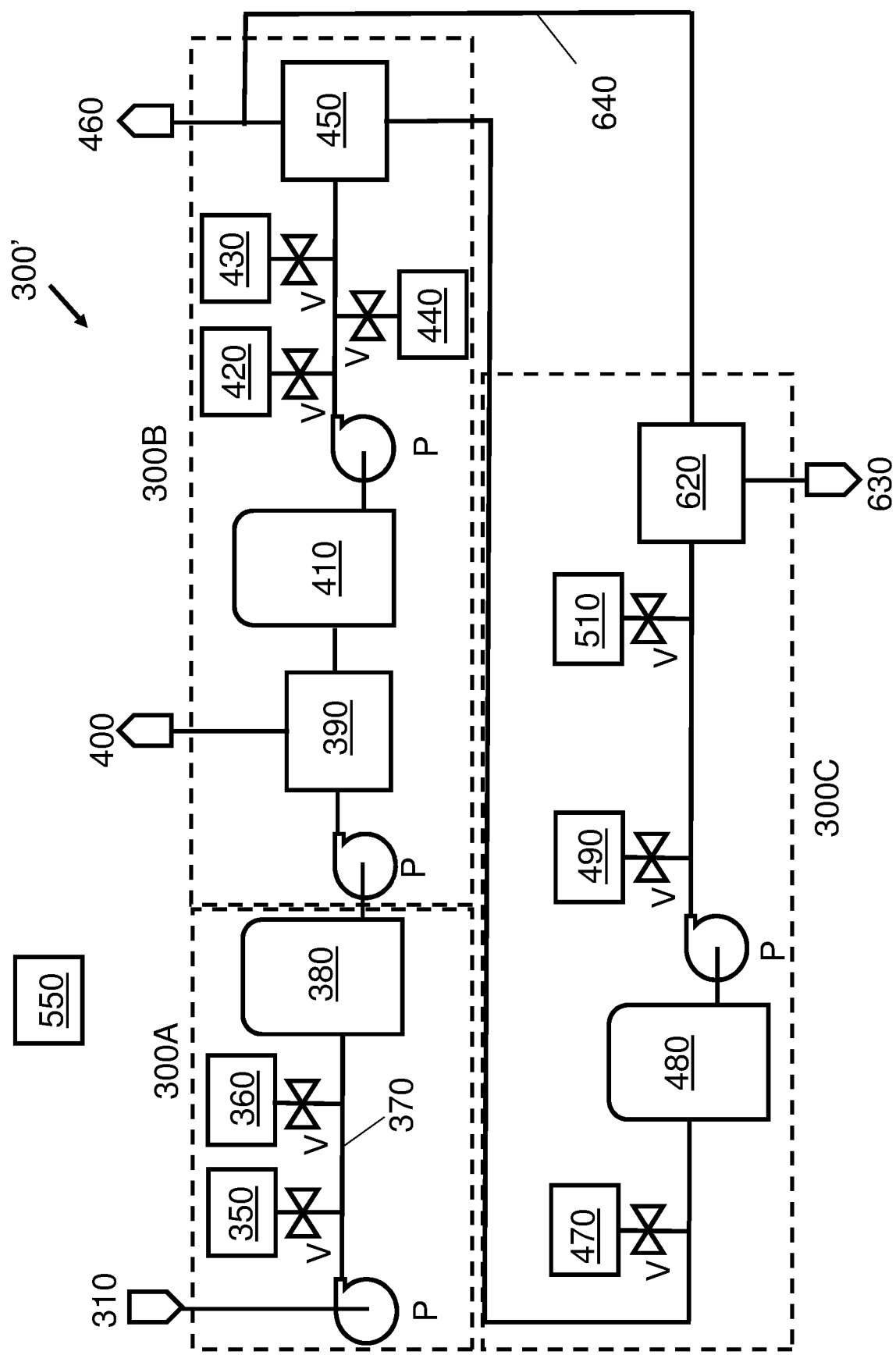
FIG. 4 illustrates another example of a system as disclosed herein.

In another embodiment 300', illustrated in FIG. 4, the brine recovery stage 300C includes an electrically driven separation apparatus 620 rather than, or in addition to, the BRRO 520. The electrically driven separation apparatus 620 may be an electrodialysis (ED) system or an electrodialysis reversal (EDR) system. In some embodiments the electrically driven separation apparatus 530 includes a NEXED® EDR system from Evoqua Water Technologies. The brine stream (the reject 465 from the RO 450) to be treated in the electrically driven separation apparatus 620 may be dosed with an anti-scaling agent and/or a pH adjustment agent from respective injection units 490 (anti-scaling agent) and 510 (pH adjustment agent, for example, sulfuric acid) to reduce the potential for scale in the concentrating, diluting, and electrode compartments of the electrically driven separation apparatus 620. Diluate 640 from the electrically driven separation apparatus 620 may be considered treated water and can be combined with permeate 460 from the RO, and/or returned to the pond 200. Concentrate 630 from the electrically driven separation apparatus 620 may be considered reject water and can be discarded, optionally after concentration by evaporation or other forms of further treatment or sent to a publicly owned treatment works. In some embodiments, the electrically driven separation apparatus 620 is operated with a recovery of 70% or greater.

Controller 550, which may be a general-purpose computer or specialized control system may be programmed with instructions to operate the various valves V, pumps P, and other unit operations of the system 300' to perform the methods disclosed herein. Connections between the controller 550 and other system components are not illustrated for sake of clarity.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method of increasing operational efficiency of a power plant, the method comprising:
   directing water from a cooling water source having a first concentration of scale-forming compounds through a treatment system to produce a treated water having a lower concentration of scale-forming components than the first concentration, operating the treatment system including:
   pretreating the water from the cooling water source in a pretreatment stage configured to produce a pretreated water,
   filtering the pretreated water in an ultrafiltration unit configured to separate the pretreated water into permeate and brine, the permeate being a first filtered water,
   backwashing the ultrafiltration unit to produce a backwash waste, and
   directing the backwash waste into the cooling water source;
   directing the treated water back into the cooling water source; and
   circulating water including the treated water from the cooling water source through a cooling system of the power plant.

2. The method of claim 1, wherein operating the treatment system further comprises:
   biologically deactivating biological organisms in the water from the cooling water source in the pretreatment stage;
   and
   treating the brine in a brine recovery stage configured to separate the brine into the treated water and a reject.

3. The method of claim 2, wherein pretreating the water from the cooling water source includes adding a biocide to the water from the cooling water source.

4. The method of claim 3, wherein pretreating the water from the cooling water source further includes adding a pH adjustment agent to the water from the cooling water source to adjust the pH of water from the cooling water source to a pH of between 6.5 and 7.5.

5. The method of claim 3, wherein pretreating the water from the cooling water source further includes holding the water from the cooling water source in a storage tank downstream of a point of injection of the biocide for a time sufficient to deactivate substantially all microorganisms that were present in the water from the cooling water source.

6. The method of claim 1, wherein treating the pretreated water in the membrane separation stage further includes filtering the first filtered water in a first reverse osmosis unit to separate the first filtered water into the permeate and the brine.

7. The method of claim 6, further comprising adding one or more of a reducing agent, an anti-scaling agent, or a pH adjustment agent to the first filtered water prior to filtering the first filtered water in the first reverse osmosis unit.

8. The method of claim 6, wherein treating the brine in the brine recovery stage includes filtering the brine in a second reverse osmosis unit to produce the treated water and the reject.

9. The method of claim 2, wherein treating the brine in the brine recovery stage includes filtering the brine in a reverse osmosis unit to produce the treated water and the reject.

10. The method of claim 9, further comprising adding a biocide to the brine prior to filtering the brine in the reverse osmosis unit and holding the brine in a storage tank downstream of a point of injection of the biocide into the brine for a time sufficient to deactivate substantially all microorganisms that were present in the brine.

11. The method of claim 9, further comprising adding one or more of a reducing agent, an anti-scaling agent, or a pH adjustment agent to the brine prior to filtering the brine in the reverse osmosis unit.

12. The method of claim 2, wherein treating the brine in the brine recovery stage includes separating the brine into the treated water and the reject in an electrically driven separation apparatus.

13. The method of claim 12, wherein treating the brine in a brine recovery stage includes separating the brine into the treated water and the reject in one of an electrodialysis system or an electrodialysis reversal system.

14. The method of claim 12, further comprising adding a biocide to the brine prior to separating the brine into the treated water and the reject in the electrically driven separation apparatus and holding the brine in a storage tank downstream of a point of injection of the biocide into the brine for a time sufficient to deactivate substantially all microorganisms that were present in the brine.

15. The method of claim 12, further comprising adding one or more of an anti-scaling agent or a pH adjustment agent to the brine prior to separating the brine into the treated water and the reject in the electrically driven separation apparatus.

16. A method of remediating water having a first concentration of scale-forming compounds from a water source, the method comprising:
    pretreating the water from the water source in a pretreatment stage configured to biologically deactivate biological organisms in the water from the water source and produce a pretreated water;
    treating the pretreated water in a membrane separation stage configured to separate the pretreated water into permeate and brine, treating the pretreated water in the membrane separation stage including:
        treating the pretreated water in a membrane separation stage configured to separate the pretreated water into permeate and brine, treating the pretreated water in the membrane separation stage includes filtering the pretreated water with an ultrafiltration unit,
        backwashing the ultrafiltration unit to produce a backwash waste, and
        directing the backwash waste into the cooling water source;
    treating the brine in a brine recovery stage configured to separate the brine into a treated water having a lower concentration of scale-forming components than the first concentration and a reject; and
    directing the treated water into the water source.

17. The method of claim 16, wherein treating the brine in the brine recovery stage includes separating the brine into the treated water and the reject in a second reverse osmosis unit.

18. The method of claim 16, wherein treating the brine in the brine recovery stage includes separating the brine into the treated water and the reject in one of an electrodialysis system or an electrodialysis reversal system.

* * * * *